United States Patent [19]

Herbst et al.

[11] Patent Number: 4,717,466

[45] Date of Patent: Jan. 5, 1988

[54] MULTIPLE RISER FLUIDIZED CATALYTIC CRACKING PROCESS UTILIZING HYDROGEN AND CARBON-HYDROGEN CONTRIBUTING FRAGMENTS

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 903,341

[22] Filed: Sep. 3, 1986

[51] Int. Cl.$^4$ .................... C10G 11/18; C10G 37/02
[52] U.S. Cl. .................... 208/113; 208/120; 208/74
[58] Field of Search ........ 208/111, 113, 120, 140–146, 208/152, 157, 73–78, 120 MC

[56] References Cited

U.S. PATENT DOCUMENTS

| | | |
|---|---|---|
| 3,617,497 | 11/1971 | Bryson et al. |
| 3,748,251 | 7/1973 | Demmel et al. |
| 3,758,403 | 9/1973 | Rosinski ............................ 208/75 X |
| 3,849,291 | 11/1974 | Owen . |
| 3,894,931 | 7/1975 | Nace et al. |
| 3,894,932 | 7/1975 | Owen . |
| 3,894,933 | 7/1975 | Owen et al. |
| 3,894,934 | 7/1975 | Owen et al. |
| 3,894,935 | 7/1975 | Owen . |
| 3,926,778 | 12/1975 | Owen et al. |
| 3,928,172 | 12/1975 | Davis, Jr. et al. |
| 3,974,062 | 8/1976 | Owen et al. |
| 4,035,285 | 7/1977 | Owen et al. ....................... 208/74 X |
| 4,116,814 | 9/1978 | Zahner . |
| 4,287,088 | 9/1981 | Sirkar . |
| 4,309,279 | 1/1982 | Chester et al. |
| 4,368,114 | 1/1983 | Chester et al. |
| 4,422,925 | 12/1983 | Williams et al. ...................... 208/75 |
| 4,436,613 | 3/1984 | Sayles et al. ........................ 208/74 |
| 4,490,241 | 12/1984 | Chou ................................. 208/75 |

Primary Examiner—Andrew H. Metz
Assistant Examiner—Glenn Caldarola
Attorney, Agent, or Firm—Alexander J. McKillop; Michael G. Gilman; Marina V. Schneller

[57] ABSTRACT

The fluidized catalytic cracking process described herein is undertaken in a first and a second riser reaction zone in which a variety of hydrocarbon conversion reactions take place, at least one stripping zone in which entrained hydrocarbon material is removed from catalyst and at least one hydrothermal catalyst regeneration zone in which spent cracking catalyst is regenerated. The process comprises: (a) converting a hydrogen-deficient first heavy hydrocarbon feed in the first riser reaction zone in the presence of at least the first catalyst component of a mixed catalyst composition comprising as said first catalyst component, an amorphous cracking catalyst and/or a large pore crystalline cracking catalyst to provide gasoline boiling range material and one or more light hydrocarbons; (b) converting a hydrogen-rich hydrocarbon feed in a lower region of the second riser reaction zone in the presence of a second catalyst composition to provide gasiform material contributing mobile hydrogen species and/or carbon-hydrogen fragments for combination with a thermally treated, relatively hydrogen-deficient second heavy hydrogen feed introduced to an upper region of the second riser reaction zone; and (c) converting the gasiform material and thermally treated, relatively hydrogen-deficient second heavy hydrocarbon feed in an upper region of the second riser reaction zone in the presence of the mixed catalyst composition to provide a gasoline product of increased octane number.

30 Claims, 1 Drawing Figure

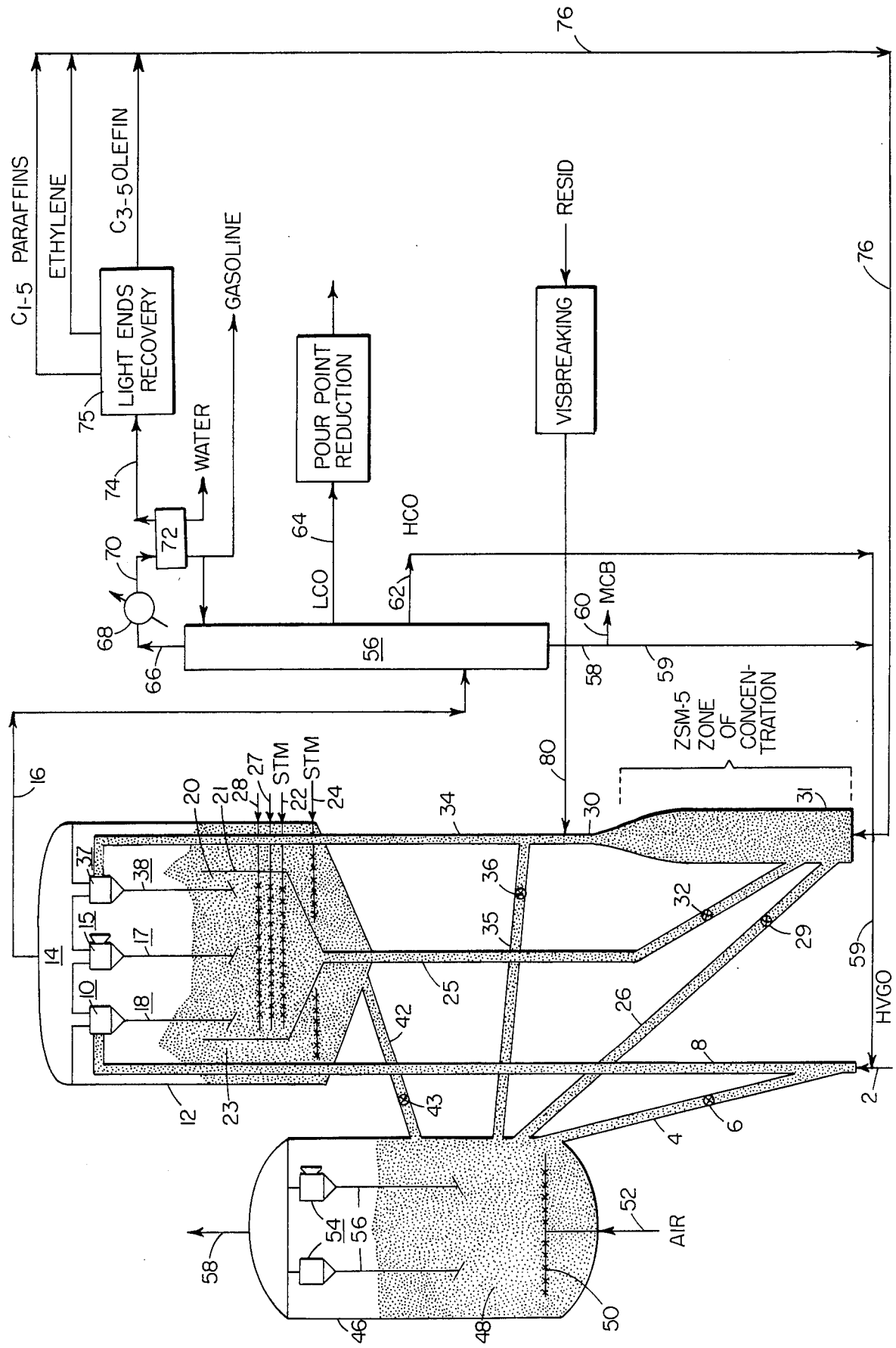

MULTIPLE RISER FLUIDIZED CATALYTIC CRACKING PROCESS UTILIZING HYDROGEN AND CARBON-HYDROGEN CONTRIBUTING FRAGMENTS

BACKGROUND OF THE INVENTION

This invention relates to a multiple riser catalytic cracking operation in which mobile hydrogen species and/or carbon-hydrogen molecular fragments are employed to increase conversion of a hydrogen-deficient heavy hydrocarbon feed, e.g., a resid, to useful products contributing to gasoline boiling range material.

In known and conventional fluidized catalytic cracking processes, a relatively heavy hydrocarbon feedstock, e.g., a gas oil, admixed with a suitable cracking catalyst to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers). Several of these processes employ a mixed catalyst system with each component of the system possessing different catalytic properties and functions. For example, in the dual riser hydrocarbon conversion process described in aforesaid U.S. Pat. No. 3,894,934, a heavy hydrocarbon first feed, e.g., a gas oil, is cracked principally as a result of contact with a large pore crystalline silicate zeolite cracking catalyst, e.g., zeolite Y, to provide lighter products. Spent catalyst is separated from the product stream and enters the dense fluid catalyst bed in the lower section of the stripping vessel. A $C_{3-4}$ olefin-rich second feed, meanwhile, undergoes coversion to cyclic and/or alkylaromatic hydrocarbons in a second riser, principally as a result of contact with a shape selective medium pore crystalline silicate zeolite, e.g., zeolite ZSM-5. Spent catalyst recovered from the product stream of the second riser similarly enters the dense catalyst bed within the stripper vessel. U.S. Pat. No. 3,894,934 also features the optional introduction of a $C_3^-$ containing hydrocarbon third feed along with an aromatic-rich charge into the dense fluid bed of spent catalyst above the level of introduction of the stripping gas to promote the formation of alkyl aromatics therein. As desired, the third feed may be light gases obtained from a fluid cracking light ends recovery unit, virgin straight run naphtha, catalytically cracked naphtha, thermal naphtha, natural gas constituents, natural gasoline, reformates, a gas oil, or a residual oil of high coke-producing characteristics.

U.S. Pat. No. 3,894,935 describes a dual riser fluid catalytic cracking process in which a gas oil is catalytically cracked in a first riser in the presence of a faujasite-type zeolite such as zeolite Y to provide gasoline boiling-range material and a $C_{3-4}$-rich hydrocarbon fraction or isobutylene is converted in a second riser in the presence of hot regenerated catalyst or catalyst cascaded thereto from the first riser to provide aromatics, alkyl aromatics and low boiling gaseous material.

In fluidized catalytic cracking operations employing mixtures of large and medium pore size crystalline silicate zeolite catalysts where catalyst separated from the product effluent is conveyed to a stripper and from there to a catalyst regenerating zone, regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with the medium pore zeolites which can maintain their catalytic activity over many more cycles of operation. However, since the large and medium pore zeolites are in intimate admixture, heretofore there has been no practical means of conveying only the large pore zeolite to the catalyst regenerator unit or, what amounts to the same thing, keeping the medium pore zeolite, or at least most of it, on the average out of the regenerator.

Thus, a principal disadvantage resulting from the use of mixed catalyst systems in known fluidized catalytic cracking operations is owing to the fact that the medium pore zeolite component is subjected to the harsh hydrothermal conditions of the catalyst regenerator unit even though it does not require regeneration anywhere near the rate at which the large pore zeolite cracking component must be regenerated. The medium pore zeolite is therefore needlessly subjected to hydrothermal deactivation at a much greater rate than is necessary for it to function.

U.S. Pat. No. 4,116,814 describes a multiple riser fluidized catalytic cracking operation utilizing a mixture of large and medium pore crystalline zeolite catalysts which differ in particle size and/or density as to facilitate their separation in a common catalyst regeneration unit. There is, however, no hint in this patent of preventing the transfer or reducing the rate of circulation of medium pore crystalline zeolite to and through the catalyst regeneration unit.

U.S. Pat. No. 4,287,088 describes a process and system for the segregation of used contaminated catalyst into fractions according to particle density differences. No mention is made of mixed catalyst systems.

It is known to upgrade hydrogen-deficient heavy hydrocarbon feedstocks such as gas oils, resid, syncrudes, etc., to more valuable products by thermal and catalytic cracking operations in admixture with a hydrogen donor diluent material. The hydrogen donor diluent is defined as a material, which releases hydrogen to a hydrogen-deficient oil in a thermal or catalytic cracking operation.

One advantage of a hydrogen donor diluent operation is that it can be relied upon to convert heavy oils or hydrogen-deficient oils at relatively high conversions in the presence of catalytic agents with reduced coke formation. Coke as formed during the cracking operation is usually a hydrocarbonaceous material sometimes referred to as a polymer of highly condensed, hydrogen-poor hydrocarbons.

Catalytic cracking systems in current operation, e.g., those referred to above, have taken advantage of new catalyst developments, that is, the use of large pore crystalline silicate zeolite cracking catalysts in preference to the earlier used amorphous silica-alumina cracking catalysts. These new crystalline zeolite cracking catalysts, e.g., zeolites X and Y, are generally regarded as low coke producing catalysts. Thus, as the level of coke deposits has been reduced through the use of crystalline zeolite cracking catalysts, it has been equally important to concentrate on recovering the maximum amount of heat available through the burning of deposited coke in the regenerator. However, when operating a catalytic cracking process within optimum conditions provided by the crystalline zeolite conversion catalysts, the petroleum refiner is still faced with operating a hydrogen-deficient process which does not permit the most optimistic recovery of desired products.

In accordance with the hydrocarbon conversion process described in U.S. Pat. No. 4,035,285, a low molecular weight carbon-hydrogen contributing material and a high molecular weight feedstock, e.g., a gas oil, are combined and reacted in the presence of one or more crystalline silicate zeolite catalysts, e.g., zeolite Y, in admixture with ZSM-5, the resulting cracking and carbon-hydrogen additive reactions producing products of improved quality and superior to those formed in the absence of the low molecular weight carbon-hydrogen contributing material. Advantages of the process include improved crackability of heavy feedstocks, increased gasoline yield and/or higher gasoline quality (including octane and volatility), and fuel oil fractions of improved yield and/or burning quality and lower levels of potentially polluting impurities such as sulfur and nitrogen. In addition, the need for high pressure hydrotreaters and hydrocrackers using relatively expensive molecular hydrogen-rich gas can be eliminated or the severity requirements of the operation greatly decreased.

A similar process in which full range crude oils and naphtha are catalytically cracked in the presence of such low molecular weight carbon-hydrogen contributing material and zeolites in separate risers of a multiple riser catalytic cracking unit is described in U.S. Pat. No. 3,974,062 referred to supra.

SUMMARY OF THE INVENTION

It is an object of the present invention to provide a fluid catalytic cracking operation featuring at least two riser reaction zones, at least one stripping zone and at least one catalyst regeneration zone employing a mixed catalyst system comprising, as a first catalyst component, an amorphous cracking catalyst and/or a large pore crystalline cracking catalyst, e.g., a zeolite such as zeolite X, Y, REY, USY, RE-USY, etc., and mixtures thereof, and, as a second catalyst component, a shape selective medium pore crystalline silicate zeolite catalyst, e.g., ZSM-5, ZSM-11, ZSM-12, ZSM-23, ZSM-35, ZSM-38, ZSM-48, etc.

It is another object of the invention to carry out a fluidized catalytic cracking operation employing said mixed catalyst system in which a hydrogen-deficient first heavy hydrocarbon feed, e.g., a gas oil, is cracked in the first riser reaction zone to provide gasoline boiling range material and one or more light hydrocarbons, e.g., a mixture of $C_{1-5}$ aliphatic hydrocarbons, and a hydrogen-rich hydrocarbon feed is thermally and/or catalytically cracked in a lower region of the second riser reaction zone to provide a gasiform material contributing mobile hydrogen species and/or carbon-hydrogen fragments for subsequent addition to a thermally treated hydrogen deficient second heavy hydrocarbon feed, e.g., a resid, introduced to an upper region of the second riser reaction zone, said gasiform material and thermally treated second heavy hydrocarbon feed undergoing conversion in said upper region of the second riser reaction zone under conditions to affect cracking and additive carbon-hydrogen reactions to provide a gasoline of increased octane number and/or higher quality.

It is a particular object of the invention to carry out the foregoing multiple riser fluidized catalytic cracking process wherein a difference in one or more physical characteristic(s) of the first and second catalyst components permits a prolongation of the residency time of the second catalyst component within the lower region of the second riser and, optionally, the separation, or segregation, of the catalyst components within a common stripping zone, such capability permitting a reduction in the rate of circulation of the less coke deactivated second catalyst component through the regeneration zone, and consequently, a conservation of its catalytic activity.

It is still another object of the invention to catalytically crack a resid and/or other hydrogen-deficient heavy hydrocarbon feed which has been subjected to visbreaking prior to introduction to the upper region of the second riser reaction zone of the foregoing dual riser catalytic cracking operation.

In keeping with these objects, there is provided a fluidized catalytic cracking process possessing at least a first and a second riser reaction zone in which a variety of hydrocarbon conversion reactions take place, at least one stripping zone in which entrained hydrocarbon material is removed from catalyst and at least one catalyst regeneration zone in which spent cracking catalyst is regenerated, which comprises:

(a) converting a hydrogen-deficient first heavy hydrocarbon feed in the first riser reaction zone in the presence of at least the first catalyst component of a mixed catalyst composition comprising, as said first catalyst component, an amorphous cracking catalyst and/or a large pore crystalline cracking catalyst and, as a second catalyst component, a shape selective medium pore crystalline silicate zeolite, to provide gasoline boiling range material and one or more light hydrocarbons;

(b) converting a hydrogen-rich hydrocarbon feed in a lower region of the second riser reaction zone in the presence of at least the second component of the mixed catalyst composition to provide gasiform material contributing mobile hydrogen species and/or carbon-hydrogen fragments for combination with a thermally treated, hydrogen-deficient second heavy hydrocarbon feed introduced to an upper region of the second riser reaction zone; and, (c) converting the combined gasiform material and thermally treated, hydrogen-deficient second heavy hydrocarbon feed in an upper region of the second riser reaction zone in the presence of the mixed catalyst composition to provide a gasoline product of increased octane number and/or higher quality, there being a sufficient difference in average particle density, particle size and/or particle geometry of the catalyst components as to confer a higher average settling rate upon particles of second catalyst component compared to that of particles of first catalyst component with the result that particles of second catalyst component will possess a longer residency time in the lower region of the second riser reaction zone compared to that of particles of first catalyst component, the former additionally defining a zone of concentration in said lower region.

The term "catalyst" as used herein shall be understood to apply not only to a catalytically active material but to one which is composited with a suitable matrix component which may or may not itself be catalytically active.

Use of the foregoing mixed catalyst system herein does much to overcome a major drawback of known and conventional mixed catalyst systems in which both catalyst components circulate through the hydrothermal catalyst regeneration zone at about the same rate. As applied, for example, to a fluidized catalytic cracking process in which a cracking catalyst requiring frequent regeneration such as zeolite Y is employed in combination with a shape selective medium pore crystalline silicate zeolite catalyst requiring comparatively infrequent regeneration such as ZSM-5, the present invention makes it possible to sustain the initial levels of activity of the latter catalyst for much longer average periods than would otherwise be the case due to the reduced incidence of its exposure to the catalyst-degrading environment of the regenerator zone. This, in turn, permits the refiner to take greater advantage of the unique catalytic capabilities of ZSM-5 in a catalytic cracking operation.

In contrast to the processes of U.S. Pat. Nos. 3,974,062 and 4,035,285 referred to above which make no provision for thermally treating a heavy hydrocarbon feed prior to its introduction to the catalytic cracking reaction zone, the process of this invention requires that the second heavy hydrocarbon feed, e.g., a resid, be thermally treated, e.g., by visbreaking, prior to admixture with the low molecular weight carbon-hydrogen contributing material. Thermal pretreatment of the second heavy hydrocarbon feed has the beneficial result of significantly enhancing the reactivity and susceptibility of the feed for adding low molecular weight carbon-hydrogen fragments. This, in turn, promotes catalytic cracking of the feed in the upper region of the second riser to products which contribute to gasoline boiling range material.

BRIEF DESCRIPTION OF THE DRAWING

The attached FIGURE of drawing illustrates a dual riser fluidized catalytic cracking process in accordance with this invention.

DESCRIPTION OF THE PREFERRED EMBODIMENTS

Conventional cracking catalyst components are generally amorphous silica-alumina and crystalline silica-alumina. Other materials said to be useful as cracking catalysts are the crystalline silicoaluminophospates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occuring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts as the first catalyst component of the mixed catalyst system. Preferred crystalline zeolite components of the mixed catalyst system herein include the natural zeolites mordenite and faujasite and the synthetic zeolites X and Y with particular preference being accorded zeolites Y, REY, USY and RE-USY The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective crystalline silicate zeolites of the mixed catalyst system herein are ZSM-5, ZSM-11, ZSM-12, ZSM-23, ZSM-35, ZSM-38 and ZSM-48 with ZSM-5 being particularly preferred.

The zeolites suitable for use in the present invention can be modified in activity by dilution with a matrix component of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a fluid catalyst cracking operation.

The catalytically active inorganic oxide may be combined with a raw or natural clay, a calcined clay, or a clay which has been chemically treated with an acid or an alkali medium or both. The matrix component is combined with the crystalline silicate in such proportions that the resulting product contains a proportion of up to about 50% by weight of the crystalline silicate material and preferably from about 0.5% up to about 25 weight percent thereof may be employed in the final composite.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, zirconium, titanium and, any trivalent metal which is heavier than aluminum. Specific examples of such catalysts include ZSM-5 and zeolite Beta containing boron, gallium, zirconium and/or titanium. In lieu of, or in addition to, being incorporated into the zeolite framework, these and other catalytically active elements can also be deposited upon the zeolite by any suitable procedure, e.g., impregnation. Thus, the zeolite can contain a hydrogen-activating function, e.g., a metal function such as platinum, palladium, nickel, iron, cobalt, chromium, rhodium, rhenium, tungsten, molybdenum, etc.

A variety of techniques can be used to bring about a difference in the settling rates of the first and second catalyst components, designated $R_1$ and $R_2$ respectively, whereby the second catalyst can be made to possess the higher settling rate and as a result remain in the second riser for a period of time which, on the average, will be longer than that of the first catalyst component. Residency time of catalyst particles in a riser is primarily dependent on two factors: the linear velocity of the fluid stream within the riser which tends to carry the entire catalyst bed/conversion products/unconverted feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite or other catalyst component which does not require as frequent regeneration as the cracking catalyst will be needlessly subjected to the catalyst-degrading conditions of the regenerator with the result that its useful catalytic life will be shortened. However, in accordance with this invention, it is possible to retain the less coke deactivated catalyst within the riser, even to the point where, because of a balance between the upward velocity of this catalyst component and its settling rate, it can be made to remain more or less stationary within a lower region of the riser defining a zone of concentration therein. To bring about this balance or to otherwise prolong the residency time of particles of second catalyst component within the lower region of the second riser, the average density, particle size and/or particle geometry of the catalyst components can be adjusted in a number of ways as to provide the desired settling characteristics. As a general guide, as the average particle size of the catalyst increases and/or its average particle density increases, the residency time of the catalyst will increase.

Among the techniques which can be used for making one catalyst component more dense than the other is compositing each catalyst with a matrix component of substantially different density. Useful matrix components include the following:

| matrix component | particle density (gm/cm$^3$) |
|---|---|
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites where it is desired to increase the residency time of the medium pore zeolite catalyst in the riser, the overall packed density of the medium pore zeolite catalyst particles inclusive of its matrix component can advantageously vary from about 0.6 to about 4.0 gm/cm$^3$, and preferably from about 2.0 to about 3.0 gm/cm$^3$, and the overall packed density of the large pore zeolite catalyst particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolites, is to composite the medium pore zeolite particles with a material which tends to coke up faster than the particle of large pore zeolite, such resulting in an increase in the density of the former in situ. Illustrative of such materials are hydrated alumina which in situ forms a transition alumina which has a faster coking rate than, for example, zeolite Y. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite particles through the riser (the latter in colliding with the medium pore zeolite catalyst particles will, as a result, have reduced velocity). In addition, the coked-up composited medium pore zeolite catalyst particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where, as here, it is desired to increase the residency time of the medium pore zeolite catalyst particles in the lower region of the second riser over that of the large pore catalyst component, the average particle size of the former will usually be larger than that of the latter. So, for example, the average particle size of the medium pore zeolite catalyst particles can be made to vary from about 500 microns to about 70,000 microns, and preferably from about 100 to about 25,000 microns while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing a catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated second catalyst component can simultaneously be made denser, larger and more irregular in shape than the catalyst particles requiring frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant difference in settling rates of the components comprising the mixed catalyst system of this invention, the second catalyst component having the greater settling rate.

By expanding the lower region of the second riser, it is possible to further prolong the residency time therein of the denser, larger and/or more irregularly shaped particles of second catalyst component.

Assuming the difference in settling rates between particles of first and second catalyst components is achieved by making the latter particles initially larger and of greater density than the former particles, gradual attrition of the larger particles (through particle collision) will progressively reduce their capability for prolonged residency in the riser and as time goes on, increasing quantities of such particles will enter the stripping zone where, however, they can still be readily separated based on their different densities. This arrangement, i.e., increased residency time in the lower region of the second riser, coupled with separation in the stripping zone maximizes the capability of the catalytic cracking process of this invention for reducing the rate of circulation of particles of the less coke deactivated second catalyst component through the regenerator zone. Thus, where there is a significant difference in the densities of the two types of catalyst, they can be separated in the stripping zone by a variety of techniques, one such technique being illustrated in the embodiment of the invention shown in the drawing.

This separation of particles of first catalyst component from those of second catalyst component in the stripping zone makes it possible to selectively transfer particles of first catalyst component, i.e., the one which requires frequent regeneration, to the regeneration zone and to cycle particles of second catalyst component, i.e., the one which requires relatively infrequent regeneration, directly to the lower region of the second riser thereby avoiding passage through the regeneration zone.

Suitable charge stocks for cracking in each riser comprise the heavy hydrocarbons generally and, in particular, petroleum fractions having an initial boiling point range of at least about 400° F., a 50% point range of at least about 500° F. and an end point range of at least about 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. In short, any hydrogen-deficient feedstock and preferably one which would require a more conventional high pressure hydrocracking and hydrotreating operation to render the feed suitable for use in a fluidized catalytic cracking operation can be used in the process of this invention.

Visbreaking, or viscosity breaking, is a preferred procedure for thermally treating the second heavy hydrocarbon feed prior to its introduction to the second riser. Visbreaking is a well known petroleum refining process in which reduced crudes are pyrrolyzed, or cracked, under comparatively mild conditions to provide products having lower viscosities and pour points. In a typical visbreaking process, the heavy hydrocarbon feed, e.g., a resid, is passed through a heater and heated from about 425° to about 600° C. at about 450 to about 7000 kPa. Examples of such visbreaking methods are described in Beuther et al., "Thermal Visbreaking of Heavy Residues," *The Oil and Gas Journal,* 57: 46, Nov. 9, 1959, pp. 151–157; Rhoe et al., "Visbreaking: A Flexible Process," *Hydrocarbon Processing,* January 1979, pp. 131–136; and U.S. Pat. No. 4,233,138, the contents of which are incorporated by reference herein.

Suitable hydrogen-rich hydrocarbon feeds are those containing from abut 12 to about 25 weigth percent hydrogen, e.g., $CH_4$, $C_2H_6$, $C_3H_8$, light virgin naphtha, and similar materials. Any or all of the $C_{1-5}$ hydrocarbons recovered from the process can be utilized as the hydrogen-rich hydrocarbon feed to the lower region of the second riser. Under the conditions prevailing in the lower region of the second riser, these and other hydrogen-rich hydrocarbon materials will undergo conversion, e.g., by thermal cracking brought about by the presence of hot, freshly regenerated cracking catalyst in this region and by shape selective catalytic cracking and other types of reactions brought about by the medium pore zeolite catalyst therein, to provide gasiform material contributing mobile hydrogen species and/or carbon-hydrogen fragments.

Referring now to the drawing, a heavy virgin gas oil feed, optionally one which has been hydrotreated, e.g., with process hydrogen, is introduced to the cracking unit by conduit 2 where it is combined with hot regenerated zeolite Y cracking catalyst together with a relatively minor percentage of the total inventory of ZSM-5 in conduit 4 containing flow control valve 6 to form a suspension of catalyst particles in oil vapors which pass upwardly through first riser 8. The conditions in the first riser include a temperature of from about 900° to about 1150° F. and preferably from about 925° to about 1000° F., a catalyst to feed ratio of from about 3:1 to about 20:1 and preferably from about 4:1 to about 10:1 and a catalyst contact time of from about 0.5 to about 30 seconds and preferably from about 1 to about 15 seconds. Under these conditions, substantial quantities of gasoline boiling range material and light hydrocarbons, e.g., paraffins and olefins containing up to about 5 carbon atoms, will be obtained. These products are separated after removal of catalyst therefrom in a cyclone separator 10 housed in the upper portion of stripping unit 12. Separated hydrocarbon vapors pass into plenum chamber 14 and are removed therefrom by conduit 16 for separation in downstream operations. Catalyst separated in cyclone 10 is conveyed by dipleg 18 into a bed of catalyst 20 residing within a vessel 21 having a conical or sloping bottom and provided with a source of stripping gas, e.g., steam, supplied through conduit 22 in the lower region thereof. Vessel 21 occupies an approximately central region of stripping unit 12, there being an annular region 23 between the two. Any particles of ZSM-5 catalyst, being of greater average density than the zeolite Y particles, tend to gravitate toward and concentrate at the bottom of vessel 21 and, following stripping, to enter return conduit 25 equipped with valve 32 for return to lower region 31 of second riser 30. Meanwhile, the ascending current of stripping gas and desorbed hydrocarbona-ceous material acts as a lift medium tending to carry the lower density particles of zeolite Y out of vessel 21 into an outer annular region 23 the lower section of which is provided with its own supply of stripping gas, again, e.g., steam, through conduit 24. Stripping gas and other gasiform material is separated from catalyst particles in cyclone separator 15, the former passing to plenum chamber 14 and the latter entering catalyst bed 20 via dipleg 17. Stripped, spent zeolite Y continues its downward flow movement and is withdrawn from the stripper through conduit 42 equipped with valve 43 where it is conveyed to regenerator 46.

In order to enhance the overall efficiency of stripping in vessel 21, a light olefin feed, e.g., a gas rich in ethylene and/or propylene, can be introduced through conduit 27 to the lower region thereof containing ZSM-5 where it is converted to higher weight products, the conversion providing an exotherm which improves the absorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to about 10, weight percent of light olefin feed can be introduced into the lower region of catalyst bed 20 by weight of total catalyst present therein. Ordinarily, then, the temperature of the catalyst bed will increase from its usual range of about 900°-1000° F. to about 950°-1100° F. and even higher. This increase in spent catalyst bed temperature significantly enhances the stripping, or desorption, of hydrocarbon and, where present, sulfur compounds, which are entrained by the catalyst particles. Thus, in carrying out the foregoing improved stripping process, it is possible to increase the recovery of such entrained hydrocarbons by from about 5 to about 30 weight percent or more compared to substantially the same stripping procedure carried out in the absence of the exothermic conversion reaction herein. Optionally, where the light olefin feed in line 27 is predominantly made up of ethylene, one or more other highly reactive light olefins, e.g., propylene, butylene or mixtures thereof, can be introduced into the catalyst through a separate conduit 28 in order to take advantage of the high partial pressure of the ethylene contained in the feed stream introduced through line 27 located therebelow. Amounts of $C_3$ and/or $C_4$ olefin material ranging from about 0.1 to about 5, and preferably from about 0.2 to about 3, weight percent of the entire catalyst bed can be suitably employed.

In fractionation zone 56, a separation of the products of conversion from riser 8 is made to recover main column bottoms (MCB) from the bottom of the fractionator by conduit 59 communicating with conduit 2 for recycle to riser 8 as desired. On the other hand, MCB may be withdrawn by conduit 60 for another use. A light cycle oil (LCO) product, is withdrawn by conduit 64. An overhead fraction lower boiling than the light cycle oil and comprising gasoline and lower boiling hydrocarbons are withdrawn from an upper portion of fractionator 56 by conduit 66. The withdrawn material in conduit 66 passes through cooler 68 and conduit 70 to knockout drum 72 wherein condensed liquids such as water and gasoline boiling material are separated from lower boiling gaseous components. The low boiling gaseous components are withdrawn by conduit 74 for passage to a light ends recovery operation 75 wherein a separation is made to recover, for example, $C_{1-5}$ paraffins and $C_{2-5}$ olefins for recycle through conduit 76. A gasoline boiling range fraction separated in drum 72 is recycled by conduit 57 as reflux to the fractionator tower.

Optional hot freshly regenerated zeolite Y catalyst is conveyed through conduit 26 equipped with valve 29 to lower region 31 of second riser 30 where it combines with stripped ZSM-5 conveyed through return conduit 25, ZSM-5 present in lower region 31 and $C_{1-5}$ light hydrocarbons recovered from gas plant operation 75 through conduit 76 to form a suspension. Due to their higher settling rate, the larger, denser and/or more geometrically irregular particles of ZSM-5 tend to define a zone of concentration in lower region 31 of riser 30. Temperature control within this region can be regulated by controlling the amount of hot, freshly regenerated Y introduced thereto. The conditions of conversion of the $C_{1-5}$ light hydrocarbon feed in the lower region of riser 31 can include a temperature of from about 1100° to about 1500° F. and preferably from about 1250° to about 1350° F., a catalyst to feed ratio of from about 50:1 to about 200:1 and preferably from about 100:1 to about 150:1 and a catalyst contact time of from about 10 to about 50 seconds and preferably from about 15 to about 35 seconds. These relatively severe operating conditions generally make it desirable to expand the diameter of the lower region of the second riser. As a result of such expansion, the linear velocity of the fluid stream will be reduced in this region with the result that the residency time of the ZSM-5 particles will be further prolonged therein. As a result of thermal cracking, shape selective cracking and other shape selective conversions taking place in lower region 31 of second riser 30, the $C_{1-5}$ light hydrocarbon feed is converted to gasiform products containing mobile hydrogen species and carbon-hydrogen fragments for participation in the addition reactions occurring in upper region 34 of second riser 10 which have for their result the improvement of the cracking operation occurring therein.

As the catalyst-hydrocarbon suspension formed in lower region 31 of second riser 30 continues to ascend the riser, it enters upper region 34 where it is combined with a thermally treated resid feed, e.g., one which has been previously treated by visbreaking in a conventional or otherwise known manner prior to its introduction to the riser through conduit 80. As a result of the visbreaking treatment, the thermally treated resid is rendered significantly more reactive and tends to pick up carbon-hydrogen fragments far more readily than it would in the absence of such treatment. Temperature regulation within upper region 34 of riser 30 can be achieved by controlling the quantity of hot, freshly regenerated zeolite Y admitted thereto through conduit 35 provided with control valve 36. In general, the temperature within upper region 34 of riser 30 can be maintained within the range of from about 950° to about 1150° F., preferably from about 1000° to about 1100° F., a catalyst to feed ratio of from about 3:1 to about 10:1, preferably from about 4:1 to about 8:1 and a catalyst contact time of from about 0.5 to about 10 seconds, preferably from about 1 to about 5 seconds. The hydrocarbon product/catalyst stream continues upwardly within riser 30 to be discharged into cyclone separator 37 provided with dipleg 38 in the upper portion of stripping unit 12. Catalyst discharged from diplegs 18 and 38 is collected in vessel 21, the denser catalyst particles of ZSM-5 being separated from the less dense catalyst particles of zeolite Y as previously described.

The products of conversion from second riser 30 are passed to plenum chamber 14 and are removed therefrom together with the products of conversion of first riser 8 by conduit 16 communicating with a conventional product recovery operation 56 described above.

Catalyst particles comprising particularly the zeolite Y cracking component of the mixed catalyst system herein accumulate a relatively high level of entrained hydrocarbonaceous material therein which is subsequently removed therefrom by regeneration with oxygen-containing regeneration gases. The stripped catalyst particles are passed by conduit 42 equipped with valve 43 to a catalyst regeneration unit representated by regenerator 46 containing a dense fluid bed of catalyst 48. Regeneration gas such as air is introduced to the lower portion of regenerator 46 by air distributor 50 supplied by conduit 52. Cyclone separators 54 provided with diplegs 56 separates entrained catalyst particles from flue gases and return the separated catalyst to the fluid bed of catalyst. Flue gases pass from the cyclones into a plenum chamber and are removed therefrom by conduit 58. Hot regenerated zeolite Y catalyst is returned to the lower region of first riser 8 by conduit 4 through a value 6 and the lower and upper regions of second riser 30 by conduits 26 and 35 as discussed above to participate in another cycle of conversion. From the foregoing, it will be appreciated that due to the prolonged residency time of ZSM-5 particles in the lower region of the second riser and the separation of ZSM-5 particles from zeolite Y particles in the stripper, it is possible to have much of the ZSM-5 catalyst bypass the regenerator altogether. As a result, the ZSM-5 catalyst particles are retained in the catalyst inventory at a higher level of activity therein for a longer average period of time than would be the case were they to circulate through the system more or less together with the zeolite Y catalyst particles.

Having thus provided a general discussion of the present invention and described specific embodiments in support thereof, it is to be understood that no undue restrictions are to be imposed by reason thereof except as provided by the following claims.

What is claimed is:

1. A fluidized catalytic cracking process possessing at least a first and a second riser reaction zone at least one stripping zone in which entrained hydrocarbon material is removed from catalyst and at least one hydrothermal catalyst regeneration zone in which spent cracking catalyst is regenerated, which comprises:

(a) converting a hydrogen-deficient first heavy hydrocarbon feed in the first riser reaction zone in the presence of at least the first catalyst component of a mixed catalyst composition comprising as said first catalyst component, an amorphous cracking catalyst and/or a large pore crystalline cracking catalyst and, as a second catalyst component, a shape selective medium pore crystalline silicate zeolite, to provide gasoline boiling range material and one or more light hydrocarbons;

(b) converting a hydrogen-rich hydrocarbon feed in a lower region of the second riser reaction zone in the presence of the second component of the mixed catalyst composition to provide gasiform material contributing mobile hydrogen species and/or carbon-hydrogen fragments for combination with a thermally treated, relatively hydrogen-deficient second heavy hydrocarbon feed introduced to an upper region of the second riser reaction zone; and (c) converting the gasiform material and thermally treated, relatively hydrogen-deficient second heavy hydrocarbon feed in an upper region of the second riser reaction zone in the presence of the mixed catalyst composition under conditions affecting cracking and additive carbon-hydrogen reactions to provide a gasoline product of increased octane number and/or higher quality, there being a sufficient difference in average particle density, particle size and/or particle geometry of the catalyst components as to confer a higher average settling rate upon particles of second catalyst component compared to that of particles of first catalyst component with the result that particles of second catalyst component will possess a longer residence time in the lower region of the second riser reaction zone compared to that of particles of first catalyst component, the second catalyst component additionally defining a zone of concentration in said lower region.

2. The process of claim 1 wherein the hydrogen-rich hydrocarbon feed comprises one or more $C_1$ to $C_5$ hydrocarbons recovered from the process.

3. The process of claim 1 wherein the thermally treated second heavy hydrocarbon feed is significantly more reactive than a substantially equivalent feed which has not been thermally treated.

4. The process of claim 3 wherein thermal treatment of the second heavy hydrocarbon feed is by visbreaking.

5. The process of claim 1 wherein the first heavy hydrocarbon feed is a gas oil.

6. The process of claim 1 wherein the thermally treated second heavy hydrocarbon feed is a thermally treated resid.

7. The process of claim 1 wherein the first catalyst component is a large pore crystalline silicate zeolite.

8. The process of claim 1 wherein the first catalyst component is a large pore crystalline silicate zeolite selected from the group consisting of zeolite X, Y, REY, USY, RE-USY, mordenite and mixtures thereof and the second catalyst component is selected from the group consisting of ZSM-5, ZSM-11, ZSM-12, ZSM-23, ZSM-35, ZSM-38 and ZSM-48.

9. The process of claim 8 in which the second catalyst component contains at least one element selected from the group consisting of boron, gallium, zirconium and titanium in the framework structure thereof and/or deposited thereon.

10. The process of claim 8 wherein the first and/or second catalyst component contains a hydrogen-activating function.

11. The process of claim 1 wherein the first heavy hydrocarbon feed is subjected to hydrotreatment prior to its introduction to the first riser.

12. The process of claim 11 wherein the hydrotreatment utilizes process hydrogen.

13. The process of claim 1 wherein step (a) is also carried out in the presence of a gasiform material contributing mobile hydrogen species and/or carbon-hydrogen fragments at the reaction conditions employed.

14. The process of claim 8 wherein, in the first riser, the temperature is within the range of from about 900° to about 1150° F., the catalyst to oil ratio is from about 3:1 to about 20:1 and the catalyst contact time is from about 0.5 to about 30 seconds.

15. The process of claim 8 wherein, in the first riser, the temperature is within the range of from about 925° to about 1000° F., the catalyst to oil ratio is from about 4:1 to about 10:1 and the catalyst contact time is from about 1 to about 15 seconds.

16. The process of claim 8 wherein, in the lower region of the second riser, the temperature is within the range of from about 1100° to about 1500° F., the catalyst to oil ratio is from about 50:1 to about 200:1 and the catalyst contact time is from about 10 to about 50 seconds.

17. The process of claim 8 wherein, in the lower region of the second riser, the temperature is within the range of from about 1250° to about 1350° F., the catalyst to oil ratio is from about 100:1 to about 150:1 and the catalyst contact time is from about 15 to about 35 seconds.

18. The process of claim 8 wherein, in the upper region of the second riser, the temperature is within the range of from about 950° to about 1150° F., the total catalyst to hydrocarbon ratio is from about 3:1 to about 10:1 and the catalyst contact time is from about 0.5 to about 10 seconds.

19. The process of claim 8 wherein, in the upper region of the second riser, the temperature is within the range of from about 1000° to about 1100° F., the total catalyst to hydrocarbon ratio is from about 4:1 to about 8:1 and the catalyst contact time is from about 1 to about 5 seconds.

20. The process of claim 1 wherein the average particle size and/or density of the particles of second catalyst component is larger than the average particle size and/or density of the particles of first catalyst component and/or the shape of the particles of second catalyst component is, on the average, more irregular than the shape of the particles of first catalyst component.

21. The process of claim 20 wherein the average particle size of the first catalyst component ranges from about 20 to about 150 microns and the average particle size of the second catalyst component ranges from about 500 to about 70,000 microns, and/or the average packed density of the first catalyst component ranges from about 0.4 to about 1.1 gm/cm$^3$ and the average packed density of the second catalyst component ranges from about 0.6 to about 4.0 gm/cm$^3$.

22. The process of claim 20 wherein the average particle size of the first catalyst component ranges from about 50 to about 100 microns and the average particle size of the second catalyst component ranges from about 1000 to about 25,000 microns, and/or the average packed density of the first catalyst component ranges from about 0.6 to about 1.0 gm/cm$^3$ and the average packed density of the second catalyst component ranges from about 2.0 to about 3.0 gm/cm$^3$.

23. The process of claim 20 wherein the second catalyst component is composited with a matrix material which imparts a significantly greater density to said component compared to the density of the first catalyst component.

24. The process of claim 23 wherein the second catalyst component is composited with a matrix material which possesses a coking rate which is higher than the coking rate of the first catalyst component.

25. The process of claim 1 wherein said difference in average particle density, particle size and/or particle geometry between particles of first and second catalyst component is such as to permit separation of particles of first catalyst component from second catalyst component in the stripping zone.

26. The process of claim 25 wherein the difference between the average particle densities of the first and second catalyst component are such as to permit their separation within the stripping zone with a counter-current stream of lift medium which separates catalyst component of lesser average particle density from the remainder of the descending catalyst particles carrying the former into a separate region of the stripping zone.

27. The process of claim 26 wherein the counter-current stream of lift medium separates catalyst component of lesser average particle density from the remainder of the descending catalyst particles contained within the central region of the stripping zone and carries the former into a separate peripheral region of the stripping zone.

28. The process of claim 27 wherein the lift medium is steam.

29. The process of claim 1 wherein the lower region of the second riser is outwardly flared.

30. The process of claim 25 wherein an exothermic reaction is carried out in the region where the second catalyst component is stripped to improve the efficiency of stripping in said region.

* * * * *